(12) United States Patent
Devereaux

(10) Patent No.: US 10,757,907 B1
(45) Date of Patent: Sep. 1, 2020

(54) AUTOMATED TEAT SANITATION SYSTEM

(71) Applicant: TDLogix, Inc., South Jordan, UT (US)

(72) Inventor: Todd S. Devereaux, South Jordan, UT (US)

(73) Assignee: TDLogix, Inc., South Jordan, UT (US)

( * ) Notice: Subject to any disclaimer, the term of this patent is extended or adjusted under 35 U.S.C. 154(b) by 151 days.

(21) Appl. No.: 15/716,379

(22) Filed: Sep. 26, 2017

Related U.S. Application Data

(60) Provisional application No. 62/399,833, filed on Sep. 26, 2016.

(51) Int. Cl.
| | |
|---|---|
| *A01J 7/04* | (2006.01) |
| *A01K 1/12* | (2006.01) |
| *B25J 15/00* | (2006.01) |
| *B25J 11/00* | (2006.01) |
| *B25J 9/16* | (2006.01) |

(52) U.S. Cl.
CPC .............. *A01J 7/04* (2013.01); *A01K 1/126* (2013.01); *B25J 9/1697* (2013.01); *B25J 11/0045* (2013.01); *B25J 15/0019* (2013.01); *Y10S 901/09* (2013.01)

(58) Field of Classification Search
CPC .. A01K 11/006; A01K 1/12; A01J 7/00; A01J 7/04; A01J 5/00; A01J 5/003; A01J 5/007; A01J 5/017; A01J 7/02
USPC ................................. 119/14.01, 14.03, 14.04
See application file for complete search history.

(56) References Cited

U.S. PATENT DOCUMENTS

| | | | | |
|---|---|---|---|---|
| 5,608,211 A | * | 3/1997 | Hirono ................... | G01B 11/24 250/234 |
| 6,189,486 B1 | * | 2/2001 | Lindholm ............. | A01J 5/0175 119/14.02 |
| 6,443,094 B1 | * | 9/2002 | DeWaard ................. | A01J 7/04 119/14.18 |
| 6,978,733 B2 | * | 12/2005 | Petterson ................. | A01J 7/00 119/14.1 |
| 8,903,129 B2 | * | 12/2014 | Hofman ................. | A01J 5/007 382/103 |
| 9,049,843 B2 | * | 6/2015 | Hofman ................ | A01J 5/0175 |
| 9,107,379 B2 | * | 8/2015 | Hofman ................... | A01J 5/00 |

(Continued)

OTHER PUBLICATIONS

Boumatic Robotics, Spray Robot SR-1, http://www.boumaticrobotics.com/en/milking/spray-robot-sr-1/, to the best of applicant's knowledge article was available before the application filing date, 2 pages, Netherlands.

(Continued)

*Primary Examiner* — Christopher D Hutchens

(57) ABSTRACT

An automated teat sanitation system to apply a disinfectant to teats of a dairy cow can include a vision system with a laser to identify a location of rear legs of the dairy cow. A controller can be coupled to the vision system to calculate a distance of the rear legs of the dairy cow, calculate a distance between the rear legs of the dairy cow, calculate a location of the udder based on the location of the rear legs of the dairy cow, and calculate an extension distance based on the location of the rear legs of the dairy cow and the location of the udder. A wand can be disposed in a spray station and can be extendable the extension distance to position a sprayer carried by the wand to spray the udder and teats thereof with disinfectant from the sprayer.

22 Claims, 4 Drawing Sheets

(56) References Cited

U.S. PATENT DOCUMENTS

| | | | | |
|---|---|---|---|---|
| 2002/0195889 | A1* | 12/2002 | Takedomi | H02H 7/0833 310/68 C |
| 2004/0194711 | A1* | 10/2004 | Petterson | A01J 7/00 119/14.1 |
| 2004/0216679 | A1* | 11/2004 | Ealy | A01J 5/0175 119/14.08 |
| 2005/0066904 | A1* | 3/2005 | Berg | A01J 5/0175 119/14.08 |
| 2008/0017119 | A1* | 1/2008 | Van Den Berg | A01J 5/017 119/14.04 |
| 2008/0303356 | A1* | 12/2008 | Aso | H02K 41/031 310/15 |
| 2011/0023785 | A1* | 2/2011 | Boersma | A01J 5/0175 119/14.08 |
| 2011/0155067 | A1* | 6/2011 | Berg | A01J 5/08 119/14.08 |
| 2012/0210938 | A1* | 8/2012 | Hofman | A01J 7/04 119/14.02 |
| 2012/0272904 | A1* | 11/2012 | Hofman | A01J 5/017 119/14.02 |
| 2015/0366157 | A1* | 12/2015 | Holmstrom | A01J 5/0175 119/651 |

OTHER PUBLICATIONS

Cotswold Dairy Equipment Co Ltd, Automatic Walk-over Teatsprayers, http://www.cotswold-dairy.co.uk/products/automatic-teatsprayers, to the best of the applicant's knowledge article was available before the application filing date, 3 pages, United Kingdom.

Gea, iNTELSPRAY2 Walkover Teat Spray System, http://www.gea.com/en/products/accessory-intelspray2-walkover-teat-spray-system.jsp, to the bet of applicant's knowledge article was available before the application filing date, 2 pages, Germany.

Green Source Automation LLC, FANUC Robotics, http://www.greensourceautomation.com/RotaryMate/Product-Information/FANUC-Robotics.html, to the best of the applicant's knowledge article was available before the application filing date, 1 page, Ceres, California.

Green Source Automation LLC, RotaryMATE EXPD, http://www.greensourceautomation.com/RotaryMate/Product-Information/RotaryMATE-EXPD.html, to the best of the applicant's knowledge article was available before the application filing date, 1 page, Ceres, California.

Green Source Automation LLC, The VisiMAX Vision System, http://www.greensourceautomation.com/RotaryMate/Product-Information/The-VisiMAX%C2%AE-vision-system.html, to the best of the applicant's knowledge article was available before the application filing date, 1 page, Ceres, California.

Nilsson, DeLaval Teat Spray Robot (TSR) sales continue to grow in America, http://www.delaval-us.com/About-DeLaval/DeLaval-Newsroom/?nid=145949, Feb. 9, 2016, 2 pages, DeLaval Inc., Sweden.

Onfarm Solutions Limited, Teatwand 400, http://www.onfarmsolutions.com/products-ofs-teatwand.html, to the best of applicant's knowledge article was available before the application filing date, 4 pages, New Zealand.

* cited by examiner

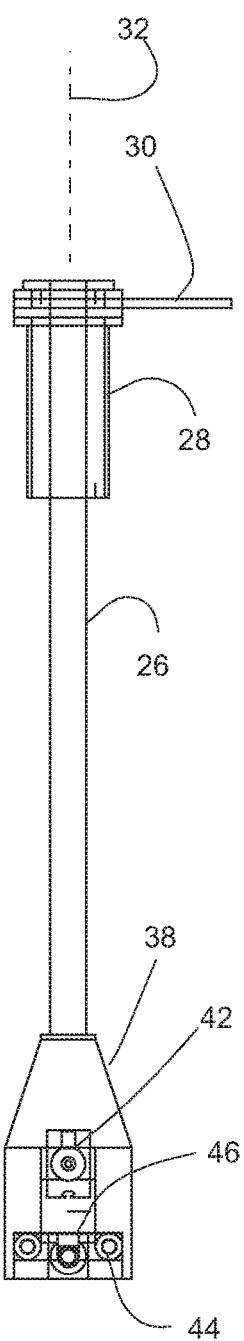
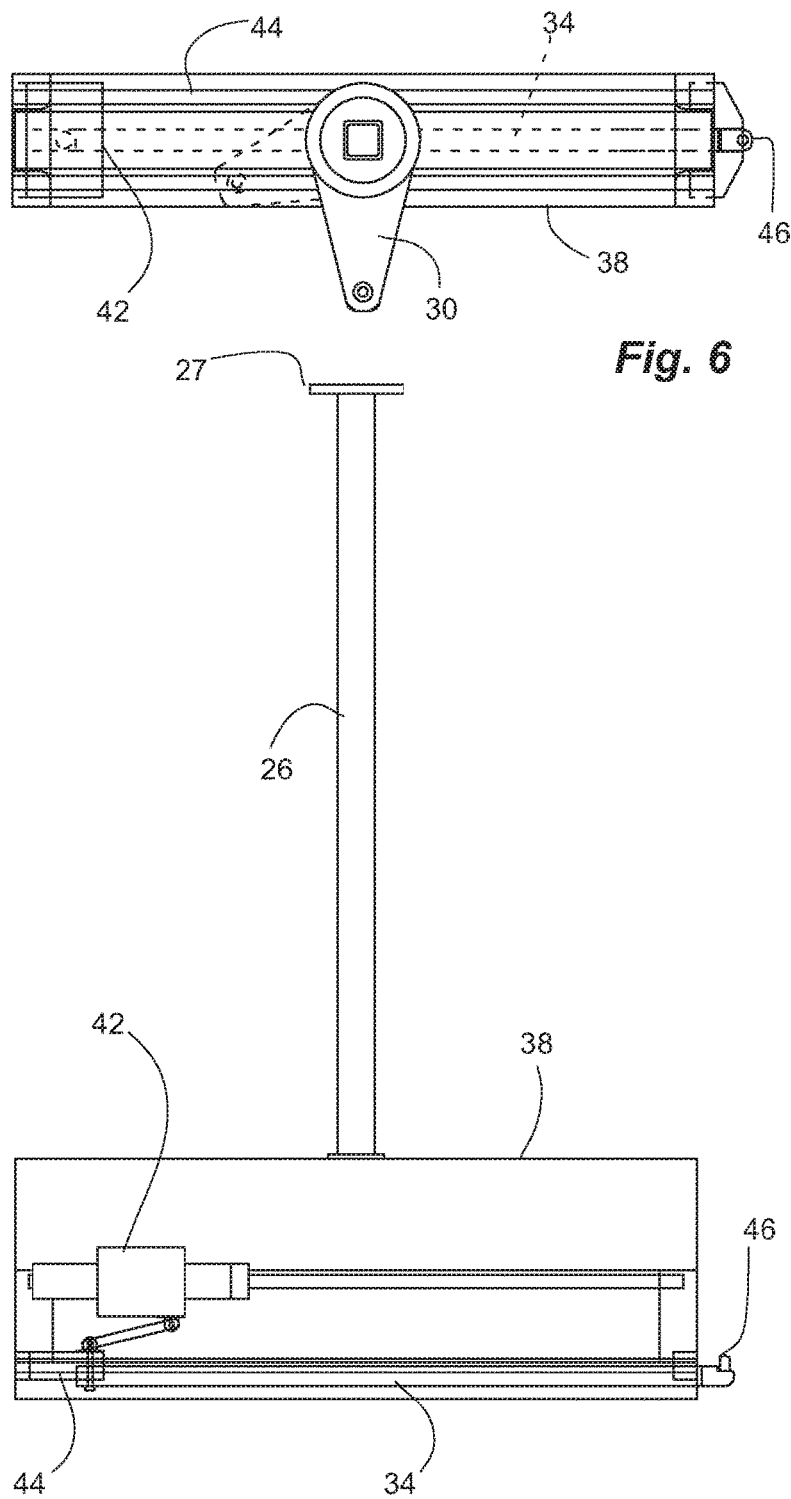

AUTOMATED TEAT SANITATION SYSTEM

RELATED APPLICATION(S)

This application claims the benefit of U.S. Provisional Patent Application Ser. No. 62/399,833, filed Sep. 26, 2016, which is hereby incorporated by reference herein in its entirety.

FIELD OF THE INVENTION

The present invention relates generally to a system and method for sanitizing the teats of a dairy cow.

BACKGROUND

The teats of a dairy cow are often sanitized using an iodine concentration prior to milking. In the past, such sanitizing was performed manually by spraying disinfectant onto the teats, or by dipping the teats into the disinfectant. Automated processes have been proposed. In one type of system, a cow's rear legs are maintained apart by a spreader while a sprayer is pneumatically extended between the cow's rear legs. For example, see the Teatwand™ by Onfarm Solutions Limited. Such systems, however, require a spreader which is believed can be uncomfortable to the cow, and which can be inaccurate. In another type of system, a robotic arm with a sprayer is guided by an IR camera that identifies the teats. For example, see the RotaryMate® robot by Green Source Automation, LLC.; and U.S. Pat. No. 7,568,447. In addition, see the Teat Spray Robot (TSR™) by DeLaval. In addition, see the Sprayrobot SR-1 by BauMatic Robotics. Such systems, however, can be expensive. Another type of system mounts a sprayer in a race to spray the teats as the cow walks over the sprayer. For example, see the Automatic Walk-Over Teatsprayer from Cotsword Dairy Equipment Co. LTD.; and the iNTELSPRAY Walkover Teat Spray System from GEA. Again, such systems can be inaccurate.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1b is a top view of the automated teat sanitation system of FIG. 1a.

FIG. 3 is a rear view of the automated teat sanitation system of FIG. 1a.

FIG. 4 is a partial front view of the automated teat sanitation system of FIG. 1a.

FIG. 5 is a partial side view of the automated teat sanitation system of FIG. 1a.

FIG. 6 is a partial top view of the automated teat sanitation system of FIG. 1a.

Figure 1A:
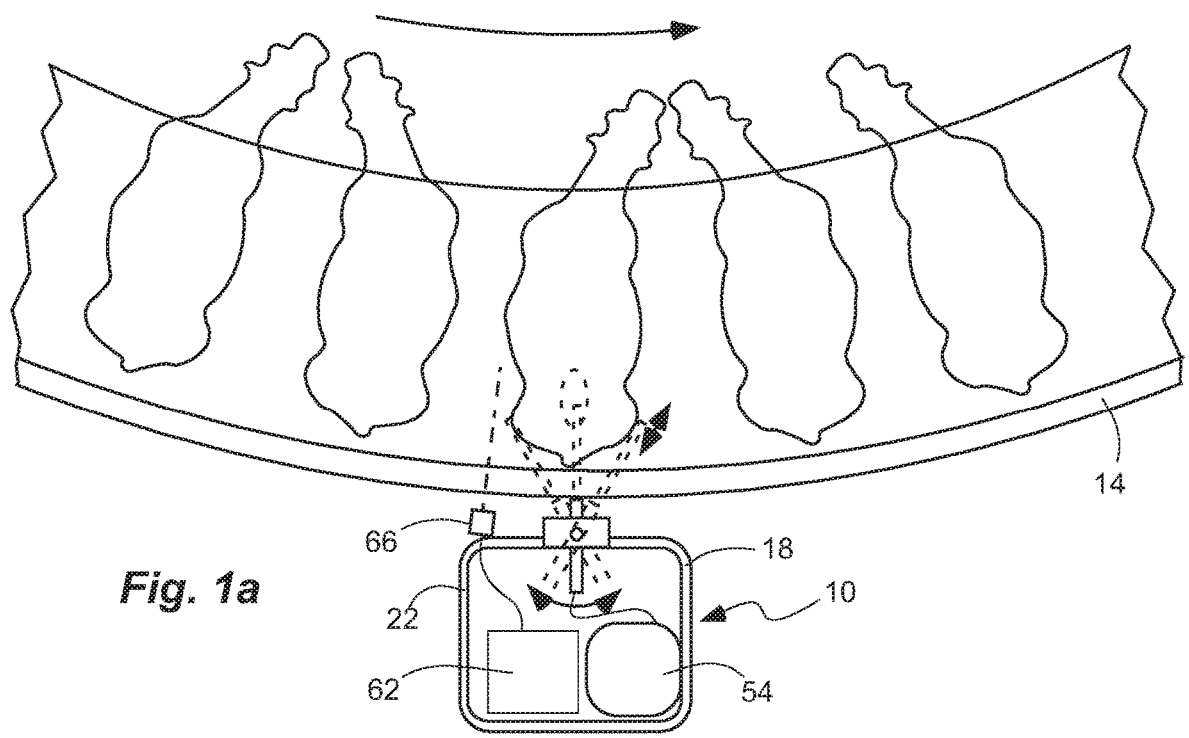
FIG. 1a is a partial top view of an automated teat sanitation system in accordance with an embodiment of the invention, shown disposed adjacent to a rotary dairy parlor.
Figure 1B:
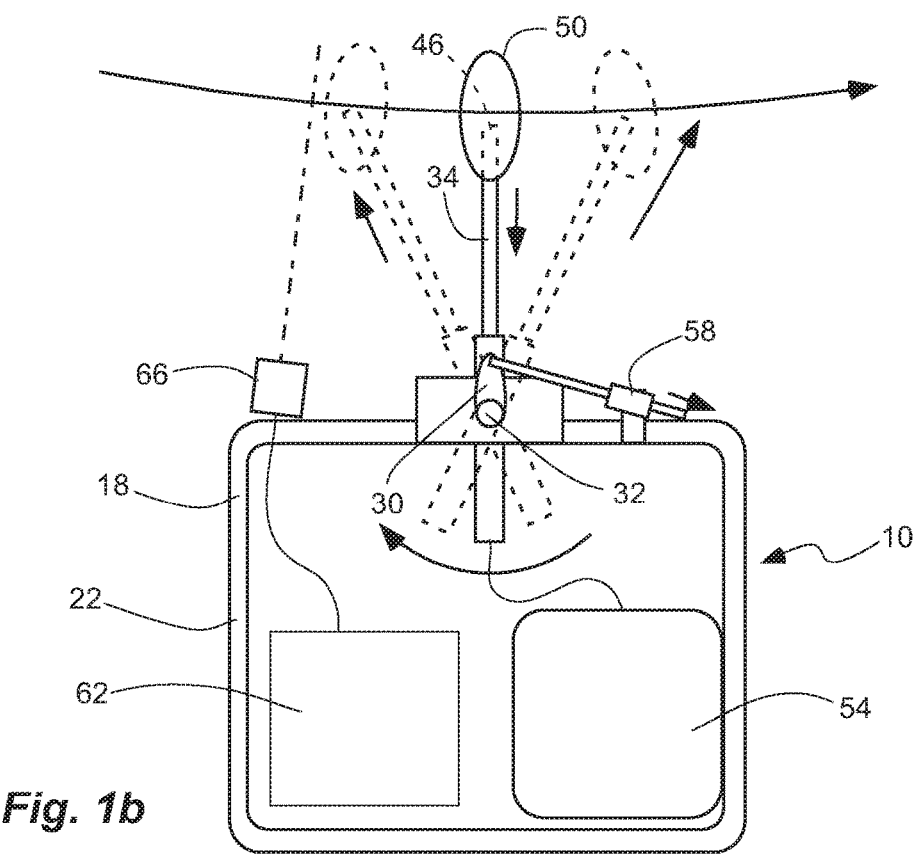
Figure 2:
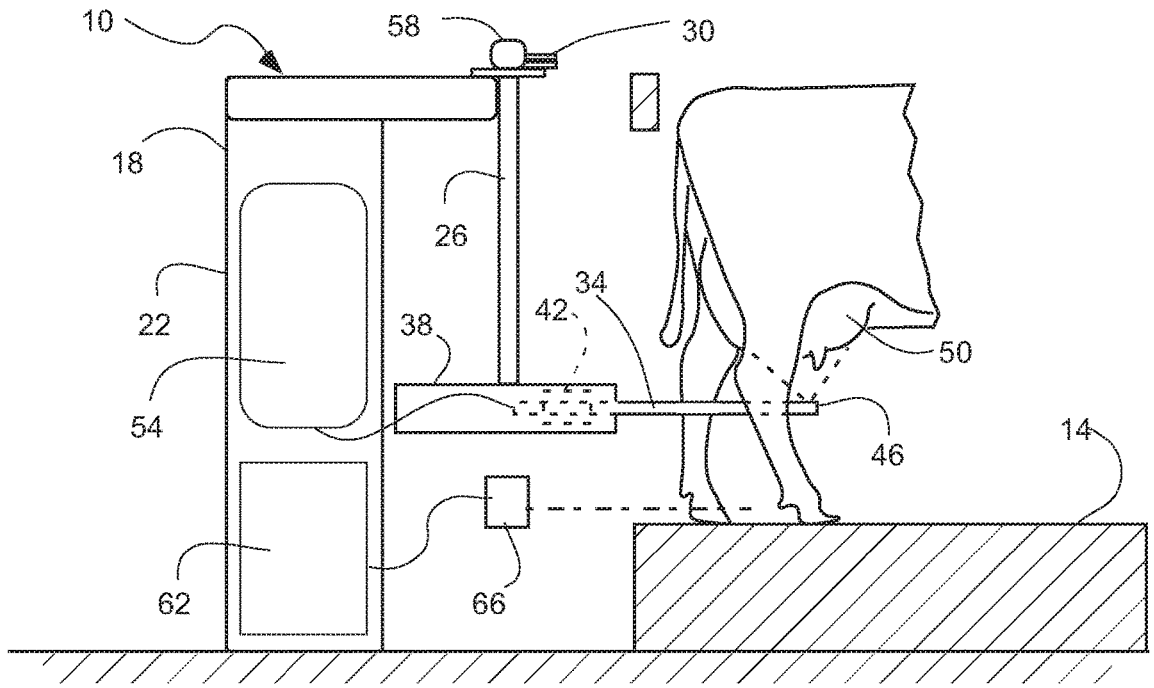
FIG. 2 is a partial side view of the automated teat sanitation system of FIG. 1a, shown disposed adjacent to the rotary dairy parlor.
Figure 3:
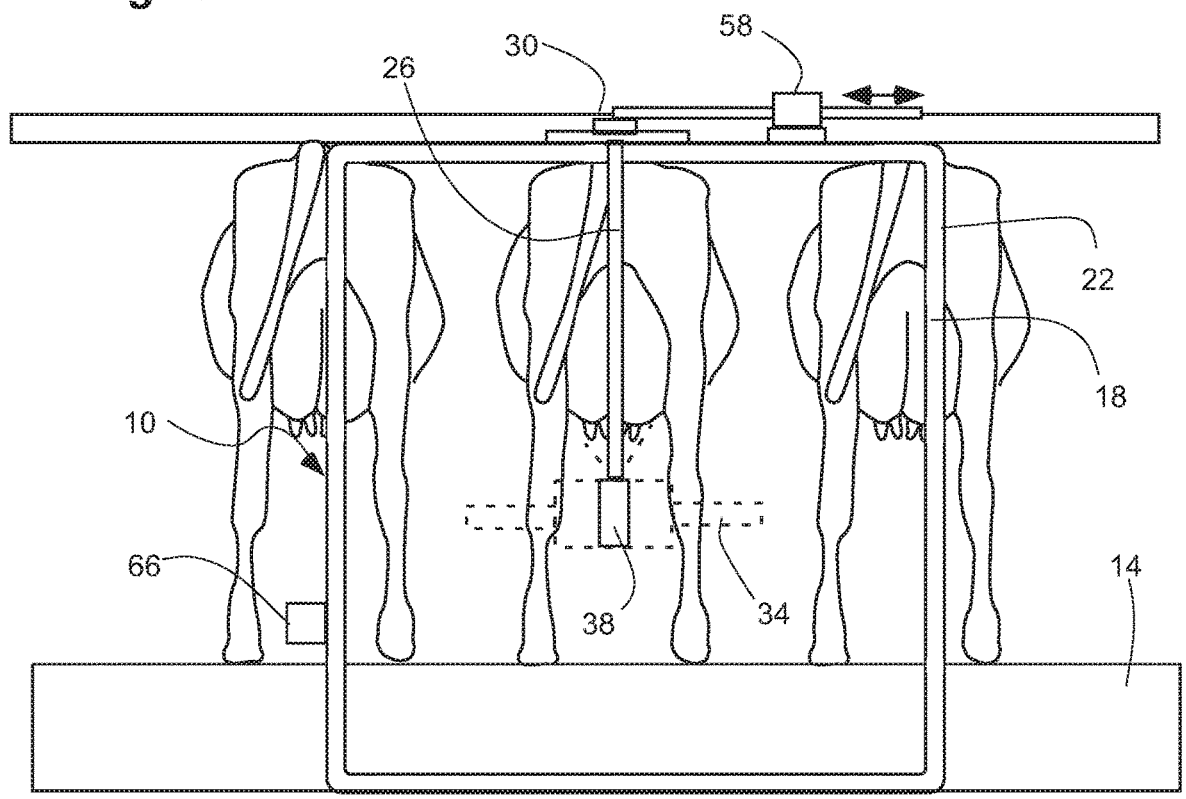

Reference will now be made to the exemplary examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

As used herein, the term "rotary dairy parlor" is large rotating platform for receiving a number of cows successively, and milking them as the cows rotate on the platform, as is understood by those skilled in the art.

The term "disinfectant" is used broadly herein to refer to a solution to sanitize the teat pre and/or post milking. Similarly, the term "sanitize" and "sanitation" as used broadly herein to refer to cleaning and/or treating the teat prep and/or post milking.

An initial overview of technology examples is provided below and then specific technology examples are described in further detail later. This initial summary is intended to aid readers in understanding the technology more quickly but is not intended to identify key features or essential features of the technology nor is it intended to limit the scope of the claimed subject matter.

An automated teat sanitation system to apply a disinfectant to teats of a dairy cow is disclosed. The system can include a vision system with a laser to identify a location of rear legs of the dairy cow. A controller can be coupled to the vision system to calculate a distance of the rear legs of the dairy cow, calculate a distance between the rear legs of the dairy cow, calculate a location of the udder based on the location of the rear legs of the dairy cow, and calculate an extension distance based on the location of the rear legs of the dairy cow and the location of the udder. A wand can be disposed in a spray station and can be extendable the extension distance to position a sprayer carried by the wand to spray the udder and teats thereof with disinfectant from the sprayer.

In addition, the spray station can be disposed adjacent a rotating dairy parlor rotating the dairy cow on the rotary dairy parlor through the spray station. An axle can be disposed in the spray station and pivotal to follow the dairy cow as the dairy cow rotates through the spray station. A wand can be carried by the axle and pivotal with the axle to follow the dairy cow as the dairy cow rotates through the spray station. A linear motor can be coupled to the wand to extend the wand as the wand pivots.

In some examples, the wand and the linear motor can be pendant from the axle.

Furthermore, a method for applying a disinfectant to teats of a dairy cow is disclosed. The method can include: identifying a location of rear legs of the dairy cow using a vision system with a laser; calculating a distance of the rear legs of the dairy cow; calculating a distance between the rear legs of the dairy cow; calculating a location of an udder based on the location of the rear legs of the dairy cow; calculating an extension distance based on the location of the rear legs of the dairy cow and the location of the udder; extending a wand the extension distance to position a sprayer carried by the wand; and spraying the udder and teats thereof with disinfectant from the sprayer.

In addition, the method can further include: rotating the dairy cow on a rotary dairy parlor through a spray station adjacent a rotating dairy parlor; pivoting a wand to follow the dairy cow as the dairy cow rotates through the spray station; extending the wand as the wand pivots to position a sprayer carried by the wand under an udder of the dairy cow; and spraying the udder and teats thereof with disinfectant from the sprayer.

In some examples, extending the wand can comprise extending the wand with a first linear motor, and pivoting the wand can comprise pivoting the wand with a second linear motor.

FIGS. 1a-7 show an example of a system 10 and a method for applying a disinfectant to teats of a dairy cow. The disinfectant can be applied as part of a milking operation in which the teats are sanitized prior to milking (and/or subsequent to milking). In addition, the system and method can be utilized with a rotary dairy parlor 14 in which the dairy cows are sequentially placed on a rotating platform and rotated around substantially an entire rotation while the teats are disinfected and the cows are milked. The system and method can have or can define a spray station 18 disposed adjacent to the rotary dairy parlor 14 or rotating platform thereof rotating the dairy cow on the rotary dairy parlor through the spray station. The system 10 and the station 18 can comprise a frame 22 or body that can carry and/or contain various components of the system. In one aspect, the frame 22 or body can be freestanding and separate and discrete from the rotary dairy parlor, or platform thereof, so that the system 10 can be used to retrofit existing dairies. In another aspect, the frame 22 can be coupled to, or even carried by the rotary dairy parlor. In one aspect, the system 10 and the station 18 can be located with respect to the rotary dairy parlor 14 prior to milking to sanitize or disinfect the teats of the cows prior to milking. In another aspect, the 10 system and the station 18 can be located with respect to the rotary dairy parlor 14 subsequent to milking to further treat or protect the teats of the cows subsequent to milking. In another aspect, a pair of systems or stations can be used with one positioned prior to milking, and the other positioned subsequent to milking. The frame 22 can form a skeleton or exoskeleton. The frame 22 can be formed of metal.

A vertical axle 26 can be disposed in the spray station 18 and pivotal to follow the dairy cow as the dairy cow rotates through the rotary dairy parlor 14. The axle 26 can pivot during use and the rotary dairy parlor can rotate in opposite directions. The axle 26 can be vertically oriented and can be suspended or pendent from the frame 22 of the spray station 18. A plate can be affixed to an upper portion of the frame, and a top of the axle 26 can be rotatably secured to the plate, and thus the upper portion of the frame 22. In one aspect, the top of the axle 26 can have an annular shoulder or flange 27 abutting a collar 28 carried by the plate, as shown in FIGS. 4 and 5. The collar 28 can form or can carry a rotational bearing in which the axle 26 pivots. A lobe 30 can be rigidly affixed to the top of the axle 26, and can turn with the axle, or can be used as a lever to turn the axle. The axle can define a vertical axis 32.

A wand 34 is carried by the axle 26, and is pivotal with the axle to follow the dairy cow as the dairy cow rotates through the spray station 18. The wand 34 can be suspended or pendent from the axle 26, and thus suspended or pendent from the frame 22 and the station 18. The wand 34 can extend from a shroud 38 that is affixed to a bottom end of the axle 26. The shroud 38 can form a housing for the wand 34 (and a first linear motor). The axle 26 and the shroud 38 can carry a first linear motor 42. Thus, the first linear motor 42 can be suspended or pendent from the axle 26, and the frame 22 and the station 18. The first linear motor 42 can be coupled to the wand 34 to extend the wand as the wand pivots. The wand 34 can be carried by a slide 44, and the first linear motor 42 can be coupled to the slide 44 to displace the slide, and thus the wand 34. In one aspect, the first linear motor 42 can itself travel along the slide to displace the slide and the wand. The slide 44 can comprise a sled or trolley movable on one or more rails or rods. The wand 34 can be mounted to the sled or trolley. As the linear motor 42 operates, the wand 34 is extended from and retracted into the shroud 38. The use of a linear motor provides accurate and robust positioning. In addition, the use of a linear motor can provide safety to workers and the cow. In one aspect, the linear motor 42 can be configured to move with limited force such that motion of the wand 34 is stopped by contact with workers or the cow. In addition, the system 18 can be configured to sense contact by the wand 34 with a worker or the cow by an amp measurement of the linear motor 42.

A sprayer 46 or nozzle is carried by the wand 34, and is positioned under an udder 50 (and teats thereof) of the dairy cow to spray the udder and teats thereof with disinfectant from the sprayer. The wand 34 can have a free distal end with the sprayer 46 or nozzle thereon, and a proximal end coupled to a tube. In one aspect, the station 18 and/or the frame 22 can carry a tank 54 containing the disinfectant. The tube can run from the tank 54 (or other source of disinfectant), through the axle 26 (or along the axle), through the wand 34 (or along the wand), to the sprayer 46 or nozzle. Thus, the axle 26 can be hollow. The tube can be flexible to accommodate pivoting and extension/retraction of the wand 34.

A second linear motor 58 can be carried by the frame 22 and coupled to the axle 26, such as via the lobe 30. Thus, the second linear motor 58 can pivot the lobe 30, and thus the axle 26, to pivot the shroud 38, and thus the wand 34. The second linear motor 58 can be similar to that described above, and such description is hereby incorporated herein by reference.

Thus, the second linear motor 58 can pivot the wand 34 so that the head or sprayer 46 thereof can follow the teats of the cow as the cow rotates on the rotary dairy parlor. In addition, the first linear motor 42 can extend (and later retract) the wand 34 so that the head or sprayer 46 thereof can extend between the cow's rear legs and position the head or sprayer 46 under the udder and teats. In one aspect, the sprayer 46 or nozzle (or head of the wand 34) can track the movement of the udder and teats as the cow rotates on the rotary dairy parlor 14. Thus, the sprayer 46 or nozzle (or head of the wand) can travel in a broad arc or arcuate path (in a horizontal plane) of travel matching the rotary dairy parlor 14. The pivoting motion axle 46 accomplished by the second linear motor 58 and the extending retracting movement of the wand 34 accomplished by the first linear motor 42 can be combined to achieve the arcuate path of travel.

Thus, the two linear motions of the linear motors 42 and 58 can be combined to create an arcuate movement path of the sprayer 46 to track movement of the teats of the cow on the rotary dairy parlor 14, with the second linear motor 58 pivoting the wand 34 and thus the sprayer 46, and the first linear motor 42 initially extending the wand 34 to locate the sprayer 46 under the udder as the cow enters the spray station 18, and then retracting the sprayer wand 34 and the sprayer 46 as the cow is in the spray station 18, and subsequently extending the wand 34 and the sprayer 46 as the cow moves further away from the spray station 18, and finally retracting the wand 34 and the sprayer 46 as the cow leaves the range of the spray station 18. In one aspect, the second linear motor 58 can pivot the axle 26 and the wand 34 faster than rotary dairy parlor 14 rotates so that the sprayer 46 can cover the teats. In another aspect, the second linear motor 58 can pivot the axle 26 and the wand 34 at the same speed as the rotary dairy parlor 14 rotates.

As the cow enters a range of the spraying station 18, the second linear motor 58 can pivot the axle 26 (and thus the shroud 38 and the wand 34) to align with the cow (or udder), and the first linear motor 42 can extend the wand 34 to position the sprayer 46 or nozzle under the udder. As the cow rotates on the rotary dairy parlor 14 and through the range of the spray station 18, the first linear motor 42 can retract the wand 34 and the sprayer 46 while the second linear motor 58 simultaneously pivots the axle 26 and the wand 34 to a midpoint of the path of travel. Through the remainder of the path of travel, the first linear motor 42 can now extend the wand 34 and the sprayer 46 while the second linear motor 58 continues to simultaneously pivot the axle 26 and the wand 34 to the end of the path of travel. The first linear motor 42 can then retract the wand 34 and the nozzle 46 as the cow leaves the range of the spraying station 18, and the second linear motor 58 can pivot the axle 26 and the wand 34 back to the starting point. In one aspect, the wand 34 can have a range of motion of approximately 45 degrees, or between 35 and 45 degrees.

The system 10 and the spray station 18 can also have a controller 62 coupled to the linear motors 42 and 58 to control the motion of the wand 34, and the position of the sprayer 46. In addition, the system 10 and the spray station 18 can have a vision system 66 with a laser configured to identify a location of rear legs of the dairy cow as the dairy cow rotates on the rotary dairy parlor 14 through the spray station 18. The vision system 66 and the laser can sense when the first leg (right rear leg) passes the vision system 66, and then when the second leg (left rear leg) passes the vision system 66. The controller 62 can be coupled to the vision system 66, and can calculate: a distance of the rear legs of the dairy cow; a distance between the rear legs of the dairy cow; a location of the udder (and thus the teats) based on the location of the rear legs of the dairy cow; and an extension distance based on the location of the rear legs of the dairy cow and the location of the udder. In addition, the vision system 66 and the laser can measure a distance of the legs from the vision system (and thus from a perimeter of the rotary dairy parlor 14). Thus, the controller 62 can also calculate a location of the udder (and thus the teats) based on the location of the rear legs of the dairy cow. The position of the teats is determined based on the location of the rear legs of the cow (and the known anatomy of the cow), rather than sensing the teats themselves, providing for a simplified system and simplified equipment. Thus, the expense of camera systems is avoided. Although the system provides some overspray, it has been found that such overspray can be negligible compared to the expense of camera systems.

In addition, the spray system 10 can sense, measure and calculate the movement of the wand 34 for a subsequent cow while the sprayer 46 is spraying a prior cow. While the system 10 is spraying the udder and teats of a first cow, a rear legs of a second cow can be identified and the control 62 can calculate the path of travel of the sprayer 46. Thus, there is no lag time for calculations.

Because the vision system 66 and the laser identifies the location of the rear legs of the cow, a separator to separate the cow's rear feet is not necessary, and is believed to provide greater comfort to the cow. The location and separation of the rear legs of the cow, and thus the position of the udder and teats, can vary between cows. Thus, the system can calculate a variable path of travel for the sprayer 46 for each cow. The sprayer 46 can have a variable sweep, with variable speed, distance, and travel path. The travel path of the sprayer 46 can be determined based on the separation between the cow's rear legs. In another aspect, the controller 62 can be coupled to existing controllers of the rotary dairy parlor 14, or the controllers of the rotary dairy parlor can be coupled to the station 18 to control movement of the wand 34 and the linear motors 42 and 58. In one aspect, the controller 62 can comprise a driver and a power supply for each of the linear motors.

Figure 7:
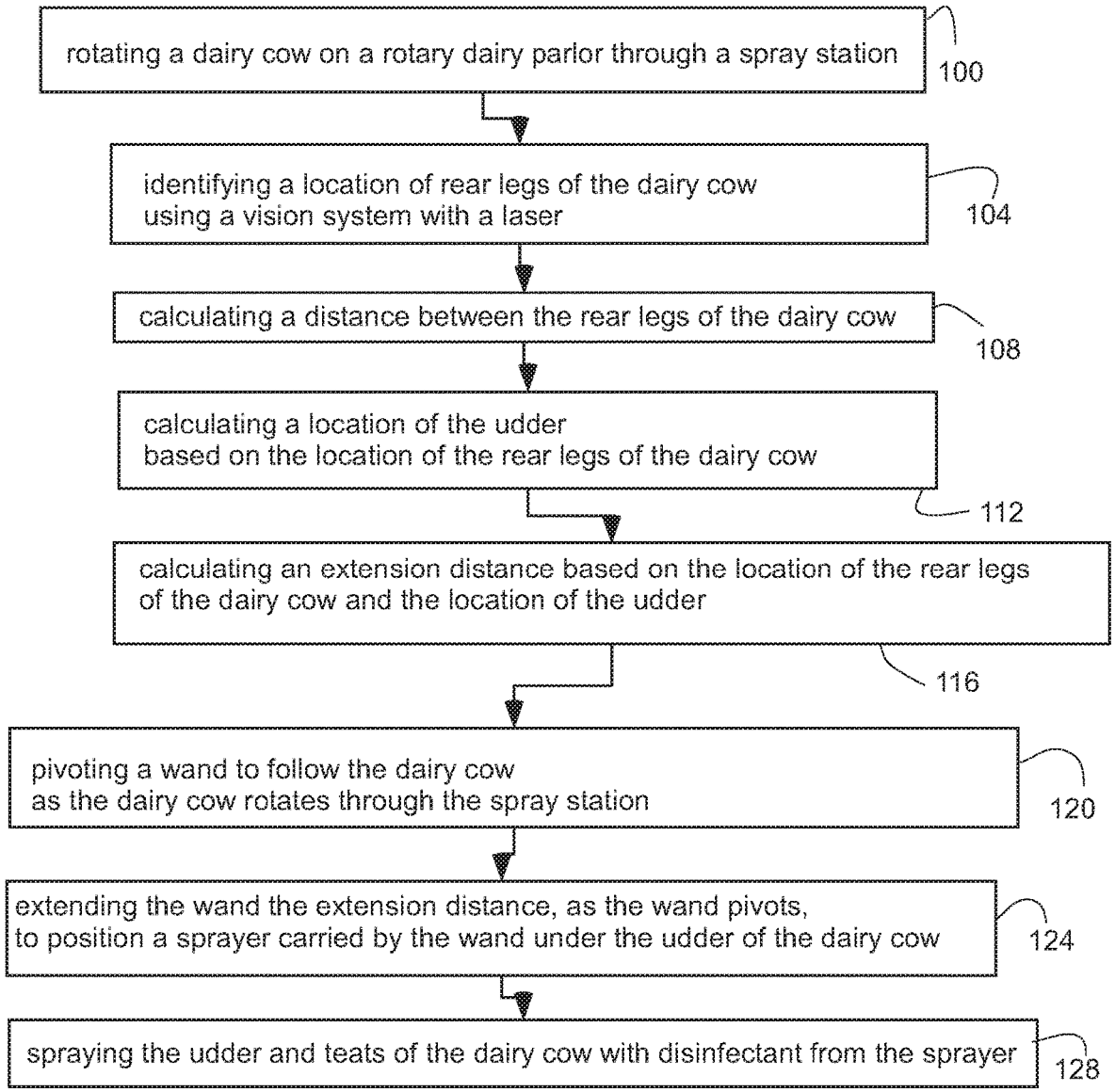
FIG. 7 is a block diagram of a method for applying a disinfectant to teats of a dairy cow.

Referring to FIG. 7, a method for applying a disinfectant to teats of a dairy cow, and for utilizing the system described above, comprises rotating 100 the dairy cow on a rotary dairy parlor 14 through a spray station 18 adjacent the rotating dairy parlor. A location of rear legs of the dairy cow can be identified 104 using a vision system 66 with a laser. A distance of the rear legs of the dairy cow and a distance between the rear legs of the dairy cow can be calculated 108 using the controller 62. A location of the udder (and thus the teats) can be calculated 112 based on the location of the rear legs of the dairy cow using the controller 62. An extension distance (for the wand 34 and the sprayer 46) can be calculated 116 based on the location of the rear legs of the dairy cow and the location of the udder using the controller 62. A wand 34 is pivoted 120 to follow the dairy cow as the dairy cow rotates through the spray station 18. The wand 34 is extended 124 as the wand pivots to position a sprayer 46 carried by the wand 34 under an udder of the dairy cow. The udder and teats thereof are sprayed 128 with disinfectant from the sprayer 46. As described above, extending the wand 34 can comprise extending the wand 34 with a first linear motor 42, and pivoting the wand 34 can comprise pivoting the wand with a second linear motor 58.

The system and method of the present disclosure are advantageous in that they provide automated teat sanitation system that is accurate and durable. The system of the present disclosure can provide a simplified system. In addition, the system of the present disclosure can provide a safe system.

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

As used herein, various examples of the present invention can be referred to herein along with alternatives for the various components thereof. It is understood that such examples and alternatives are not to be construed as de facto equivalents of one another, but are to be considered as separate and autonomous representations of the present invention.

Furthermore, the described features, structures, or characteristics can be combined in any suitable manner in one or more examples. In the description, numerous specific details are provided, such as examples of lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the inventive concepts in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An automated teat sanitation system configured to apply a disinfectant to teats and an udder of a dairy cow, the system comprising:
   a vision system with a laser configured to identify a location of rear legs of the dairy cow;
   a controller coupled to the vision system configured to calculate a length of the rear legs of the dairy cow, calculate a distance between the rear legs of the dairy cow, and calculate a location of the udder of the dairy cow, wherein each calculation is based on the location of the rear legs of the dairy cow identified by the laser; the controller further being configured to calculate an extension distance to extend a sprayer based on the location of the rear legs of the dairy cow and the location of the udder; and
   a wand carrying the sprayer and disposed in a spray station and extendable the extension distance and configured to position the sprayer to spray the udder and the teats thereof with disinfectant from the sprayer.

2. The system of claim 1, further comprising:
   the spray station being disposable adjacent a rotary dairy parlor configured to rotate the dairy cow through the spray station;
   a vertical axle carrying the wand and pivoting the wand with respect to the spray station and configured to follow the dairy cow as the dairy cow rotates through the spray station; and
   a linear motor extending the wand as the wand pivots and configured to position the sprayer carried by the wand under the udder of the dairy cow.

3. The system of claim 2, wherein the wand and the linear motor are pendant from the axle.

4. The system of claim 2, wherein the vertical axle is pendent from the spray station.

5. The system of claim 2, wherein the vertical axle of the spray station is configured to pivot in an opposite direction to the rotation of the rotary dairy parlor.

6. The system of claim 2, further comprising:
   a shroud disposed on a bottom end of the axle;
   the linear motor being disposed in the shroud; and
   the wand extending from the shroud.

7. The system of claim 1, further comprising:
   a slide coupled to the wand; and
   a linear motor coupled to the slide to displace the wand along the slide.

8. An automated teat sanitation system configured to apply a disinfectant to teats and an udder of a dairy cow rotating on a rotary dairy parlor, the system comprising:
   a spray station configured to be disposed adjacent the rotary dairy parlor configured to rotate the dairy cow on the rotary dairy parlor through the spray station;
   a vertical axle disposed in the spray station and pivotal with respect to the spray station and configured to follow the dairy cow as the dairy cow rotates through the spray station;
   a wand carried by the axle and pivotal with the axle and configured to follow the dairy cow as the dairy cow rotates through the spray station;
   a linear motor coupled to the wand to extend the wand as the wand pivots, wherein the linear motor moves with limited force such that the motion of the wand is stopped upon contact with another object; and
   a sprayer carried by the wand and extendable with the wand and configured to be positioned under the udder of the dairy cow to spray the udder and teats thereof with disinfectant from the sprayer.

9. The system of claim 8, further comprising:
   a vision system with a laser configured to identify a location of rear legs of the dairy cow as the dairy cow rotates on the rotary dairy parlor through the spray station; and
   a controller coupled to the vision system configured to calculate a length of the rear legs of the dairy cow, calculate a distance between the rear legs of the dairy cow, calculate a location of the udder based on the location of the rear legs of the dairy cow; and calculate an extension distance to extend the sprayer based on the location of the rear legs of the dairy cow and the location of the udder.

10. The system of claim 8, wherein the wand and the linear motor are pendant from the axle.

11. The system of claim 8, wherein the vertical axle is pendent from the spray station.

12. The system of claim 8, wherein the vertical axle of the spray station is configured to pivot in an opposite direction to the rotation of the rotary dairy parlor.

13. The system of claim 8, further comprising:
   a shroud disposed on a bottom end of the axle;
   the linear motor being disposed in the shroud; and
   the wand extending from the shroud.

14. The system of claim 8, further comprising:
   a slide coupled to the wand; and
   the linear motor coupled to the slide to displace the wand along the slide.

15. The system of claim 8, wherein the linear motor is configured to sense contact of the wand with the another object via an amp measurement.

16. A method for applying a disinfectant to teats and an udder of a dairy cow, the method comprising:
   identifying a location of rear legs of the dairy cow using a vision system with a laser;
   calculating a length of the rear legs of the dairy cow and a distance between the rear legs of the dairy cow based on the location of the rear legs of the dairy cow identified by the laser;

calculating a location of the udder based on the location of the rear legs of the dairy cow identified by the laser;

calculating an extension distance to extend a sprayer based on the location of the rear legs of the dairy cow and the location of the udder identified by the laser;

extending a wand the extension distance to position the sprayer carried by the wand; and spraying the udder and teats thereof with disinfectant from the sprayer.

17. The method of claim 15, further comprising:

rotating the dairy cow on a rotary dairy parlor through a spray station having the wand; and pivoting the wand to follow the dairy cow as the dairy cow rotates through the spray station.

18. The method of claim 17, wherein extending the wand comprises extending the wand with a first linear motor, and wherein pivoting the wand comprises pivoting the wand with a second linear motor.

19. A method for applying a disinfectant to teats of a dairy cow, the method comprising:

rotating the dairy cow on a rotary dairy parlor through a spray station adjacent the rotating dairy parlor;

pivoting a wand to follow the dairy cow as the dairy cow rotates through the spray station;

extending the wand as the wand pivots to position a sprayer carried by the wand under an udder of the dairy cow, wherein the wand is extended via a linear motor that travels along a slide to displace the wand; and spraying the udder and teats thereof with disinfectant from the sprayer.

20. The method of claim 19, further comprising:

identifying a location of rear legs of the dairy cow using a vision system with a laser;

calculating a length of the rear legs of the dairy cow and a distance between the rear legs of the dairy cow;

calculating a location of the udder based on the location of the rear legs of the dairy cow; and calculating an extension distance to extend the sprayer based on the location of the rear legs of the dairy cow and the location of the udder.

21. The method of claim 19, wherein extending the wand comprises extending the wand with a first linear motor, and wherein pivoting the wand comprises pivoting the wand with a second linear motor.

22. The method of claim 19, wherein the slide comprises a sled or a trolley moveable on one or more rails or rods.

* * * * *